United States Patent Office 3,500,065
Patented Mar. 10, 1970

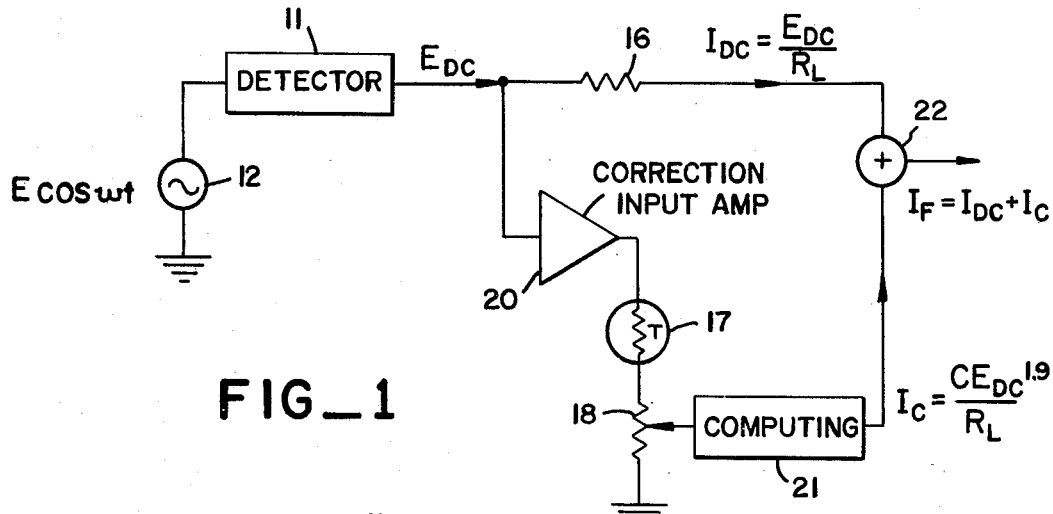
FIG_1
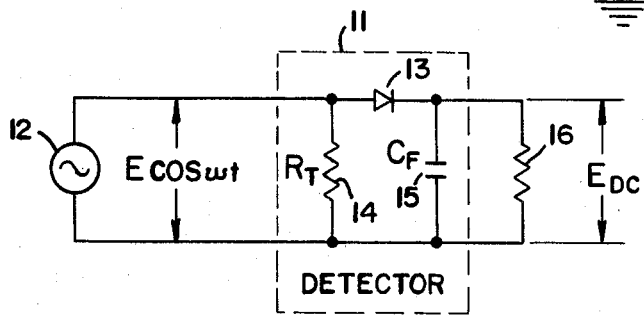
FIG_2
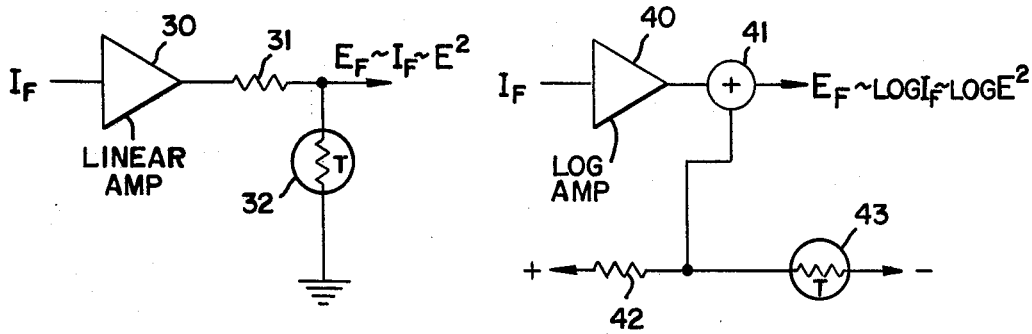
FIG_3    FIG_4
*INVENTOR.*
JAMES H. KERINS
BY
*Townsend and Townsend*
ATTORNEYS

3,500,065
METHOD AND APPARATUS FOR COMPENSATING CRYSTAL DETECTORS
James H. Kerins, Sunnyvale, Calif., assignor to Pacific Measurements, Inc., Palo Alto, Calif.
Filed Dec. 18, 1967, Ser. No. 691,378
Int. Cl. G06g 7/24; H04b 1/10
U.S. Cl. 307—229
14 Claims

ABSTRACT OF THE DISCLOSURE

A method and apparatus for compensating crystal detectors is disclosed wherein the D.C. output voltage of the crystal detector is converted into an output current and wherein the compensating current is also generated from the D.C. output voltage by a computing operation for re-combination with the output current to provide a final current proportional to the A.C. power input to the crystal detector over a wide range of power inputs. Absolute power level temperature compensation is provided for the final signal.

---

This invention relates to a new and improved method and apparatus for compensating the output of crystal detectors, used in high frequency A.C. power meters and similar devices, to provide either a linear or a logarithmic output over a wide range of A.C. power inputs and a wide range of temperatures.

Crystal detectors have been found suitable for use in high frequency A.C. power meters and similar devices because of their high speed response characteristics. The response of the typical crystal detector, however, is non-linear over a wide range of A.C. power input levels. Thus, at low power signal levels, the D.C. output voltage of the detector is proportional to the power input, i.e., it is proportional to the square of the amplitude of the A.C. votlage input. At high power signal levels, the detector becomes a peak indicating device and the D.C. output voltage is directly proportional to the amplitude of the A.C. input voltage. At intermediate A.C. power input levels, the D.C. output voltage undergoes a non-linear transition between the two types of response.

It is an object of the present invention to provide a new and improved method and apparatus for compenating crystal detectors to provide a D.C. output signal proportional to the A.C. power input over a wide range of A.C. power inputs from approximately —40 dBm to +20 dBm. Another object of the invention is to provide means for compensating a crystal detector to provide either a linear response proportional to the A.C. power input or a logarithmic response proportional to the logarithm of the A.C. power input over a wide range of input power levels. A further object of the invention is to provide crystal detector compensating means providing either a linear or logarithmic response over a wide range of A.C. power input levels, and a wide range of temperatures.

In order to accomplish these results, the present invention contemplates generating an output current from the D.C. output voltage of the crystal detector and also generating from the D.C. output voltage by a computing operation, a compensating current for power level compensation, having a predetermined functional relationship to the D.C. output voltage so that upon combination of the output current and compensation current a final current is produced proportional to the A.C. power input at the crystal detector over a wide range of power input levels. The invention also contemplates alternatively providing either a linear amplifier or a logarithmic amplifier for providing a final signal proportional to either the A.C. power input or the logarithm of the A.C. input power.

Another aspect of the invention contemplates providing a temperature-sensitive thermistor network for absolute level temperature compensation over a range of 15° C. to 45° C.

Other objects, features and advantages of the present invention will become apparent in the following specification and accompanying drawings.

FIG. 1 is a block diagram of one method and apparatus embodying the present invention.

FIG. 2 is a schematic diagram of the crystal detector having an input to which an A.C. signal is applied and also having a D.C. output voltage.

FIG. 3 is a diagram of a circuit for providing absolute level compensation for a linear output signal.

FIG. 4 is a diagram of a circuit for providing absolute level compensation for a logarithmic output signal.

In the embodiment of the present invention illustrated in FIG. 1 there is generally provided a crystal detector 11 having an input to which an A.C. signal 12 is applied and a D.C. output voltage $E_{DC}$. Referring more particularly to FIG. 2, the crystal detector 11 comprises a crystal diode 13 connected in series with the A.C. input signal 12 and between a resistance 14 and capacitance 15 connected in parallel across the A.C. input signal. The D.C. output voltage $E_{DC}$ from the crystal detector appears across a detector load resistance 16. The D.C. output voltage is related to the amplitude E of the A.C. input signal by the following equation where $R_v$ is the diode low level video impedance, $R_L$ equals the detector load resistance 16, $\alpha$ is proportional to the $q/kT$ of the diode, E is the peak value of the amplitude of the detected A.C. signal, and $I_0$ is the zero order modified Bessel function of the first kind.

$$\left[1+\left(\frac{R_V}{R_L}\right)\alpha E_{DC}\right]_e \alpha E_{DC} = I_o(\alpha E)$$

An analysis of the above equation shows that for low signal levels below —20 dBm, the relationship of $E_{DC}$ to E is closely approximately by the following equation:

$$E_{DC} = \frac{\alpha E^2}{4\left(1+\frac{R_V}{R_L}\right)}$$

It is apparent from this equation that the D.C. output voltage is proportional to the A.C. power input at low signal levels. Above zero dBm the D.C. voltage output $E_{DC}$ is directly proportional to E, while in signal level range from —20 dBm to zero dBm the D.C. output voltage undergoes a non-linear transition between the two types of response.

In order to provide an output from the crystal detector proportional to the A.C. input power over the whole range of A.C. input power levels from —40 dBm to +10 dBm, the present invention contemplates generating a correction signal $E_C$ for power level compensation having a functional relationship to $E_{DC}$ so that the sum of $E_C$ and $E_{DC}$ will be proportional to the A.C. input power over the desired range. It has been discovered that the compensation signal $E_C$ necessary to produce this result is approximately related to the D.C. voltage output by the following equation where C is a constant dependent on the $\alpha$ and the $R_V/R_L$ of the detector:

$$E_C = CE_{DC}^{1.9} \text{ for } .28 < \frac{R_V}{R_L} < .66$$

In the embodiment of the invention illustrated in FIG. 1, the D.C. output voltage signal and compensating voltage signal are converted to currents before summing. The D.C. output voltage $E_{DC}$ produces an output current $I_{DC}$ through the detector load resistance 16 equal to $E_{DC}/R_L$. The D.C. output voltage is also tapped by a computing circuit through the correction input amplifier 20 which isolates the detector from the correction signal circuitry. The correction input amplifier must be carefully designed in order to minimize the injection of error signals into the detector output. The thermistor 17 and variable potentiometer 18 temperature compensate the correction signal for variation in the operating parameters of the crystal detector due to variation in temperature. The parameters $\alpha$ and $R_V$ of the crystal detector are temperature dependent in a predictable way so that relative level temperature compensation over the range of 15° to 45° may be provided by means of the simple thermistor-potentiometer network. Because the parameters of each crystal detector are different, the variable potentiometer 18 is provided.

The compensating current $I_C$ equal to $E_C/R_L$ is generated by a computing circuit in the isolated correction signal circuit. The computing operation may consist of a feedback amplifier with a diode shaping network in the feedback loop. The preferred computing operation, however, is to take the logarithm of the crystal detector output signal, multiply it by 1.9, and then take the antilogarithm of the resulting signal. The antilogarithm output, equal to $$\frac{CE_{DC}^{1.9}}{R_L}$$

i.e., the compensation current $I_C$, would then be applied to the summing network 22 to which the output current $I_{DC}$ is also fed. Logarithmic amplifiers such as those described in U.S. Patent No. 3,237,028 issued to Gibbons in 1966 may be used for taking the logarithm and antilogarithm of the applied signal while a linear amplifier of suitable gain or signal multiplier may be used to multiply the logarithm signal by 1.9. The correction constant C may be set by means of a bias adjustment in the antilogarithm circuit.

The resulting compensating current $I_C$ is equal to $$\frac{CE_{DC}^{1.9}}{R_L}$$

and when summed with the output current $I_{DC}$ produces a final current $I_F$ appropriately power level compensated to be proportional to the A.C. power input over the desired range of input power levels. If a final signal proportional to the A.C. power input is desired, the final current $I_F$ would be fed to a linear amplifier. If a final signal proportional to the logarithm of the A.C. input power is desired, the current $I_F$ would be fed to the input of a logarithmic amplifier and the output signal would then be proportional to the logarithm of the power input. The final current $I_F$ may also be compensated against temperature variation for absolute power level measurement.

For a linear output signal, i.e., an output signal proportional to the A.C. input power, absolute level compensation is accomplished as shown in the circuit in FIG. 3. The final current is converted to an output voltage by means of a linear amplifier 30 and the amplifier output applied to a single thermistor network consisting of resistor 31 and thermistor 32 connected to ground. The thermistor network provides a temperature sensitive variable voltage divider producing a final signal $E_F$ proportional to the A.C. power input over the desired range of power input levels, and desired temperature range.

For a logarithmic output, the final current is applied to a logarithmic amplifier 40 whose output is proportional to the logarithm of the A.C. input power at the crystal detector. The output of logarithmic amplifier 40 is summed through the summing network 41 with a bias signal applied through resistor 42 and thermistor 43 which provide a variable temperature sensitive voltage divider. A final signal $E_F$ is produced proportional to the logarithm of the A.C. power input over the desired range of power input levels, and desired temperature range.

The minimum detectable A.C. power level at the input to the crystal detector depends upon the sensitivity of the detector and the quality of the amplifier 30 or 40 in FIGS. 3 and 4 which follows the summing network in FIG. 1. The maximum detectable A.C. power level at the input to the crystal detector depends upon the breakdown voltage of the detector as well as the dynamic range of the compensating signal circuitry. A sensitivity range of at least —40 dBm to +20 dBm is obtainable.

Although only certain embodiments of the present invention have been shown and described it is apparent that other adaptations and modifications of the present invention may be made without departing from the true spirit and scope of the following claims.

What is claimed is:
1. Apparatus for compensating a crystal detector having an input and an output comprising: means converting a D.C. output voltage $E_{DC}$ from the crystal detector to a proportional output current $I_{DC}$; means generating a compensating current $I_C$ from said D.C. output voltage having a predetermined functional relationship to the D.C. output voltage for power level compensation; means summing said output current and compensating current to produce a final current proportional to the input power to said crystal detector over a predetermined range of power input levels.

2. Apparatus for compensating crystal detectors as set forth in claim 1 wherein the predetermined functional relationship between the compensating current $I_C$ and the D.C. output voltage $E_{DC}$ is given by the following equation where $R_L$ is the crystal detector load resistance, and C a constant dependent upon the operating parameters of the crystal detector:

$$I_c = \frac{CE_{DC}^{1.9}}{R_L}$$

3. Apparatus for compensating crystal detectors as set forth in claim 1 wherein there is also provided a correction input amplifier at the output of the crystal detector to isolate the means for generating the compensating signal from the output from said crystal detector.

4. Apparatus for compensating crystal detectors as set forth in claim 1 wherein said means for generating a compensating signal comprises a logarithmic amplifier to which the D.C. output signal from said crystal detector is fed; a signal multiplier to which the output from said logarithmic amplifier is fed to multiply the logarithmic amplifier output by a predetermined factor; and an antilogarithmic amplifier to which the output from said signal multiplier is fed, said antilogarithmic amplifier including a bias adjustment and the output from said antilogarithmic amplifier being fed to said summing means.

5. Apparatus for compensating crystal detectors as set forth in claim 1 wherein there is provided in series with said means for generating a compensating current, means providing relative temperature compensation comprising a simple thermistor network to compensate for variations in the parameters of said crystal detector due to variations in temperature.

6. Apparatus for compensating crystal detectors as set forth in claim 1 wherein the output current from said summing means is fed to a linear amplifier, and wherein the output signal from said linear amplifier is fed through a thermistor network comprising a resistance in series and a shunt thermistor to ground whereby absolute power level temperature compensation is provided.

7. Apparatus for compensating crystal detectors as set forth in claim 1 wherein the output current from said summing means is fed to a logarithmic amplifier, and the output signal from said logarithmic amplifier is fed to one of two inputs in a summing network, the other input to said summing network being derived from a temperature sensitive bias comprising a biasing voltage across a temperature variable voltage divider comprising a resistor and a thermistor whereby absolute power level temperature compensation is provided at the output from said second summing means to thereby provide a signal proportional to the logarithm of the A.C. power input at said crystal detector over a predetermined range of power input levels.

8. Apparatus for compensating a crystal detector as set forth in claim 1 wherein said means generating a compensating current comprises a diode shaping network.

9. Apparatus for compensating a crystal detector having an input and an output and wherein an A.C. signal at the input produces a D.C. voltage output $E_{DC}$ comprising: a detector load resistance $R_L$ through which the D.C. output voltage $E_{DC}$ is converted to a proportional current $I_{DC}$ according to the following relationship:

$$I_{DC} = \frac{E_{DC}}{R_L}$$

means generating a compensating current $I_C$ from said D.C. output voltage $E_{DC}$ having a predetermined functional relationship to the D.C. output voltage according to the following relationship where C depends on the operating parameters of the crystal detector; and a summing network whereby the output current $I_{DC}$ and compensating current $I_C$ are added to produce a final current proportional to the A.C. input power over a predetermined range of input power levels.

10. Apparatus for compensating a crystal detector having an input and output and wherein an A.C. voltage input produces a D.C. voltage output signal from the crystal detector comprising: means for converting said D.C. output voltage $E_{DC}$ to a proportional output current $I_{DC}$; means generating a compensating current from said D.C. output voltage comprising a logarithmic amplifier, signal multiplier, and antilogarithmic amplifier, whereby a compensating current $I_C$ is generated having a predetermined functional relationship to said D.C. output voltage for power level compensation; temperature compensating means comprising a thermistor network in series with said compensating current generating means to thereby compensate for variations in the parameters of the crystal detector produced by variations in temperature; a correction input amplifier connected between the D.C. output voltage from said crystal detector and said temperature compensating means and compensating current generating means to thereby isolate said compensating current generating means from the D.C. output voltage from said crystal detector; and a summing network to which said compensating current $I_C$ and output current $I_{DC}$ are fed to thereby provide a final current $I_F$ equal to $I_{DC}+I_C$ and proportional to the A.C. power input to said crystal detector over a predetermined range of power input levels.

11. Apparatus for compensating crystal detectors as set forth in claim 10 wherein the predetermined functional relationship between said compensating current $I_C$ and said D.C. output voltage $E_{DC}$ from said crystal detector is given by the following equation:

$$I_C = \frac{CE_{DC}^{1.9}}{R_L}$$

12. Apparatus for compensating crystal detectors as set forth in claim 10 wherein the output from said summing network is fed through an amplifier to provide a final signal and a thermistor network for absolute level compensation of the final signal.

13. A method of compensating crystal detectors which produce a D.C. voltage output from an A.C. input signal comprising: converting the D.C. output voltage from said crystal detector to an output current; generating a compensating current from said D.C. output voltage having a predetermined functional relationship with said D.C. output voltage for power level compensation; summing said output current and compensating current to provide a final current proportional to the A.C. power input over a predetermined range of power input levels.

14. A method of compensating crystal detectors as set forth in claim 13 wherein there is also provided the steps of converting the final current to a proportional final voltage signal and compensating said final voltage signal for variations due to temperature changes.

References Cited

UNITED STATES PATENTS

| 2,782,995 | 2/1957 | McCormack | 328—3 |
| 3,234,404 | 2/1966 | Peters | 328—145 |

DONALD D. FORRER, Primary Examiner

DAVID M. CARTER, Assistant Examiner

U.S. Cl. X.R.

307—310; 328—3, 145, 163, 172